(12) United States Patent
Offenhaeuser

(10) Patent No.: US 9,701,314 B2
(45) Date of Patent: Jul. 11, 2017

(54) METHOD FOR DETECTING THE ATTENTIONAL STATE OF THE DRIVER OF A VEHICLE

(71) Applicant: Robert Bosch GmbH, Stuttgart (DE)

(72) Inventor: Andreas Offenhaeuser, Marbach am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 55 days.

(21) Appl. No.: 14/546,765

(22) Filed: Nov. 18, 2014

(65) Prior Publication Data

US 2015/0145683 A1 May 28, 2015

(30) Foreign Application Priority Data

Nov. 25, 2013 (DE) ........................ 10 2013 223 989

(51) Int. Cl.
*G08B 23/00* (2006.01)
*B60W 40/08* (2012.01)
*G08B 21/06* (2006.01)

(52) U.S. Cl.
CPC ............. *B60W 40/08* (2013.01); *G08B 21/06* (2013.01)

(58) Field of Classification Search
CPC ........ G08B 21/06; G08B 1/167; G08B 21/02; G08B 21/0453; G08B 21/0407; B60W 40/08; B60W 2040/0809; B60W 40/09; B60W 2540/22; B60W 2040/0818; B60W 2040/0836; B60W 2540/26; B60W 2540/18; B60K 28/066; B60K 28/06; B60K 28/02; G06K 9/00845; G06K 9/00248

USPC ..... 340/576, 575, 438, 439, 425.5; 701/300, 701/301; 180/271, 272
See application file for complete search history.

(56) References Cited

U.S. PATENT DOCUMENTS

| | | | | |
|---|---|---|---|---|
| 5,717,606 A | * | 2/1998 | Hara | G08B 21/06 180/272 |
| 6,282,478 B1 | * | 8/2001 | Akita | B60K 31/00 303/125 |
| 6,313,749 B1 | * | 11/2001 | Horne | G08B 21/06 340/575 |
| 8,068,968 B2 | * | 11/2011 | Kondoh | B60W 30/16 180/272 |
| 8,260,501 B2 | * | 9/2012 | Nakagoshi | B60W 40/08 180/272 |
| 2010/0039249 A1 | * | 2/2010 | Schmitz | B60K 28/066 340/439 |
| 2011/0118979 A1 | * | 5/2011 | Mao | G01C 21/005 701/532 |
| 2013/0093888 A1 | * | 4/2013 | Kim | G08B 21/06 348/148 |

FOREIGN PATENT DOCUMENTS

DE     10 2005 05726     6/2007

* cited by examiner

*Primary Examiner* — Anh V La
(74) *Attorney, Agent, or Firm* — Norton Rose Fulbright US LLP; Gerard Messina

(57) ABSTRACT

A method for detecting the attentional state of the driver of a vehicle includes ascertaining an attention index from the lateral deviation from the original lane and the steering angle correction.

20 Claims, 1 Drawing Sheet

METHOD FOR DETECTING THE ATTENTIONAL STATE OF THE DRIVER OF A VEHICLE

RELATED APPLICATION INFORMATION

The present application claims priority to and the benefit of German patent application no. 10 2013 223 989.0, which was filed in Germany on Nov. 25, 2013, the disclosure of which is incorporated herein by reference.

FIELD OF THE INVENTION

The present invention relates to a method for detecting the attentional state of the driver of a vehicle.

BACKGROUND INFORMATION

Patent document DE 10 2005 057 267 A1 discusses a method for detecting the condition of the driver, in which a reduced attentional state of the driver is inferred from the subsequent steering angle correction process in the event of a lane departure. The departure from the original lane is ascertained from data of a lane keeping system, the steering angle correction process from the measured signals of a steering angle sensor, which are compared with a typical reaction pattern. Reduced attention may usually be assumed when there is a sudden steering angle change in response to the departure from the lane after a phase of little activity.

SUMMARY OF THE INVENTION

The present invention is based on the object of detecting the attentional state of the driver of a vehicle by using simple measures and a high level of certainty.

The object may be achieved according to the present invention with the features described herein. The further descriptions herein define advantageous refinements.

The attentional state of the driver of a vehicle may be detected with the aid of the method according to the present invention. The prerequisite is a sensor system in the vehicle with which the steering angle over time may be ascertained, i.e., usually a steering angle sensor and a sensor unit for ascertaining the instantaneous vehicle position with respect to the original lane of the roadway or the lateral deviation of the vehicle from the original lane. For example, a lane keeping system or assistant may be used for this purpose, with which an original lane on the roadway is ascertained and the vehicle is kept in the original lane with only minimal lateral deviation or none at all. Such lane keeping systems are known in principle and may be used for the method according to the present invention for detecting the attentional state of the driver.

Lateral deviation detection devices, which are able to ascertain the distance across the original lane of the vehicle, are fundamentally sufficient. In addition to lane keeping systems, this may also include navigation systems, for example, which are capable of ascertaining the instantaneous vehicle position with high accuracy. The original lane is derived either from a surroundings sensor system of the vehicle or from data from a navigation system.

In the method according to the present invention, an attention index is formed as a scale for the driver's attentional state, the attention index being formed from at least one component of the lateral deviation of the vehicle from the original lane and one component of the steering angle correction, which occurs immediately in response to the lateral deviation. A higher attention index here stands for an inferior attentional state than a lower attention index. This procedure has the advantage that both the lateral deviation and the steering angle correction enter into the calculation of the attention index and are thus taken into account in ascertaining the attentional state of the driver. This increases the accuracy in ascertaining the attentional state. If the attention index exceeds an assigned limiting value, then a reduced attentional state must be assumed. It is also possible to use the level of the attention index as a scale for the driver's instantaneous attentional state.

The attention index may be formed either exclusively from one component of the lateral deviation of the vehicle from the original lane and one component of the steering angle correction, or additional influencing variables are also taken into account in ascertaining the attention index.

The attention index may be formed from the components of the lateral deviation and the steering angle correction in different ways. According to one advantageous embodiment, the lateral deviations from the original lane and the steering angle correction are multiplied with one another and each enters into the equally weighted attention index. However, it is also possible, for example, to add the components of the lateral deviation and the steering angle correction in the attention index.

According to another advantageous embodiment, the maximum lateral deviation and the subsequent maximum steering angle correction are taken into account per deviation and correction event each time the attention index is ascertained. It is thus clarified that with each deviation and correction event, only the respective maximum values are taken into account in ascertaining the attention index.

One attention index is advantageously formed for each deviation and correction event. In the event of multiple chronologically successive deviations and corrections, one attention index is ascertained in each case, multiple attention indices being combined to form an overall index, which forms the scale for the driver's attentional state. This has the advantage that the frequency of a deviation from the original lane and an associated steering angle correction are taken into account in forming the attention index. Thus, both the frequency and severity are mappable via the attention index, whereby a single lateral deviation with a high amplitude by itself may be enough for a reduced attentional state, but on the other hand, multiple successive lateral deviations of only a low amplitude may not indicate a reduced attentional state.

According to another advantageous embodiment, in addition to the absolute values of the lateral deviation and the corresponding steering angle correction, additional determination and/or state variables may be taken into account, in particular the steering angle correction rate at which the steering angle correction is carried out by the driver. In the event of reduced attention due to fatigue, for example, the steering angle correction is usually carried out by yanking the steering wheel back, which may be detected via the steering angle speed. If the steering angle speed exceeds an associated limiting value, this indicates a reduced attention, which may be taken into account through the attention index, the calculation of which may include the additional influencing variables such as the steering angle correction rate.

When forming the overall index by adding up the individual attention indices as a scale for the attentional state, it is appropriate that the attention index drops between two successive deviation and correction events, then takes into account an attentional state which might be increasing with this drop. It is possible to control how much the attention index is reduced between the successive deviation and correction events by using the time constant of the drop-down curve. In the case of a greatly reduced attention, several deviation and correction events are carried out within a short period of time, so that the individual attention indices may also drop only slightly. At the moment of a newly occurring deviation and correction event, the newly formed attention index is added to the reduced value of the preceding attention index to form the total index. This total index drops in the remaining course until another deviation and correction event occurs. If there are longer periods of time between the individual deviation and correction events, the index may drop relatively sharply, whereas if the deviation and correction events occur in very close chronological order, the total index will decrease only slightly between the events and will increase again each time a new attention index is formed.

Various measures may be taken as a consequence of a reduced attentional state. For example, it is possible to generate a warning signal in the vehicle, which is displayed for the driver by visual, acoustic or haptic methods, as soon as the attention index exceeds a limiting value and a reduced attentional state on the part of the driver is to be assumed accordingly.

It is also possible to reparameterize a driver assistance system in the vehicle as a function of the attention index, for example, to parameterize a restraint system or an electronic stability program (ESP) in such a way that the driver's reduced attentional state is taken into account by an earlier onset of intervention measures. Furthermore, it is possible, by influencing a unit in the vehicle such as the drive engine, the steering or the brake, for example, or by triggering a driver assistance system, to directly carry out an intervention into the driving dynamics of the vehicle.

Additional advantages and advantageous embodiments may be derived from the additional claims, the description of the figures and the drawings.

DETAILED DESCRIPTION

Figure 1:
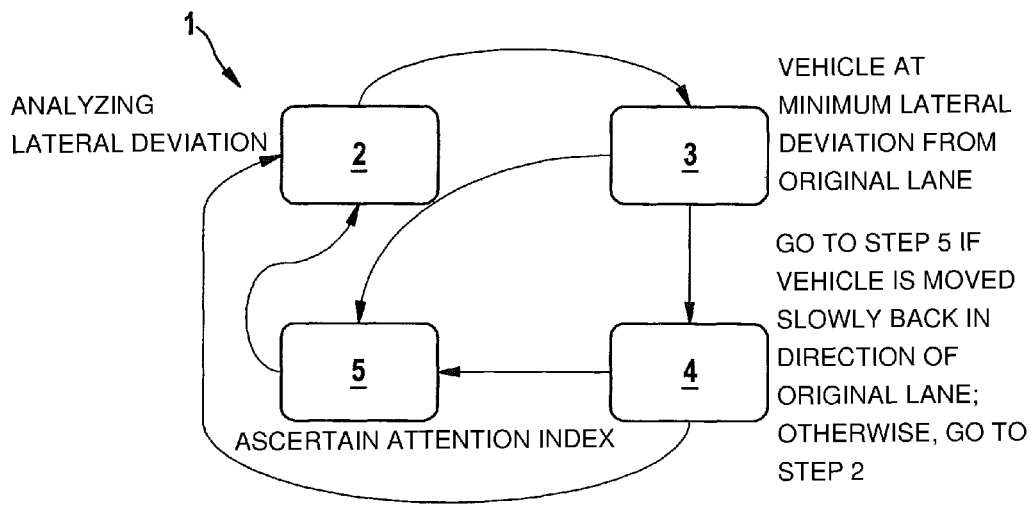
FIG. 1 shows a block diagram having different method steps for ascertaining an attention index representing the attentional state.

The block diagram 1 shown in FIG. 1 serves to detect the attentional state of the driver of a vehicle by analyzing a lateral deviation of the vehicle from the original lane and the subsequent steering angle correction. In a first method step 2, it is analyzed whether the lateral distance of the vehicle from the original lane exceeds a threshold value. As an alternative, it is also possible to query whether the period of time until exceeding a defined lateral deviation value from the original lane drops below an associated threshold value. Again in this case, the lateral deviation of the vehicle from the original lane is so great that a steering angle correction is required. In this case, the method is continued from method step 2 to the next method step 3.

In method step 3, the vehicle is thus at a minimum lateral deviation from the original lane. Depending on how the steering angle correction is carried out by the driver, the method advances either to next method step 4 or directly to method step 5. The jump from step 3 to step 5 takes place for the case when the driver specifies a large corrective steering angle, which exceeds a limiting value. Alternatively, the method advances initially to step 4 and then to step 5 only when the vehicle is initially moved slowly back in the direction of the original lane through intervention by the driver into the steering angle and subsequently a jerky correction takes place. The difference in time between the reversal from the edge of the lane and the jerky steering angle correction must not exceed a threshold value here.

In step 5 an attention index is ascertained by multiplying the two components from the maximum lateral deviation of the vehicle from the original lane and the maximum steering angle correction. If necessary, another influencing variable may also be taken into account, in particular the steering angle correction rate.

Figure 2:
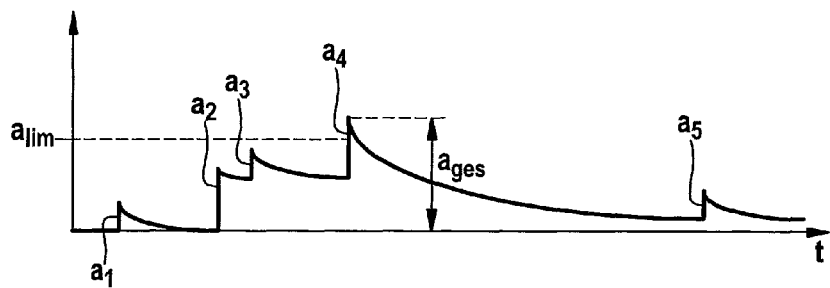
FIG. 2 shows a diagram having a time-dependent curve of the attention index during the occurrence of multiple chronologically successive deviation and correction events.

FIG. 2 shows a diagram with the curve of attention indices $a_1$ through $a_5$ plotted as a function of time. Each attention index a is ascertained per deviation and correction event, the instantaneous value of attention index a dropping exponentially in the remaining course over time. On renewed occurrence of a deviation and correction event, a new attention index a is calculated and is added to the value of the previous attention index.

As indicated by the exemplary embodiment according to FIG. 2, the first attention index $a_1$ assumes a low value, which drops back to zero over time in the remaining course until the occurrence of the second deviation and correction event. Second attention index $a_2$ is significantly larger than the first attention index. A short time after the second deviation and correction event, the third deviation and correction event takes place with attention index $a_3$, which is added to the instantaneously valid value of second attention index $a_2$ at the point in time of the third deviation and correction event.

This operation of adding the various attention indices is carried out continuously while taking into account the decline in the respective added-up value until the next occurrence of a deviation and correction event. In the exemplary embodiment, an assigned limiting value $a_{lim}$ is exceeded on occurrence of the fourth deviation and correction event with attention index $a_4$ which is added to total index $a_{ges}$, taking into account the preceding attention indices. Limiting value $a_{lim}$ stands for a reduced attentional state of the driver. On exceeding limiting value $a_{lim}$, measures may be taken, such as generating a warning signal in the vehicle, reparameterization of a driver assistance system or triggering of a driver assistance system.

The total index drops again in the remaining course. The occurrence of a fifth deviation and correction event having attention index $a_5$ also does not result in exceeding limiting value $a_{lim}$ in the exemplary embodiment.

What is claimed is:

1. A method for detecting an attentional state of a driver of a vehicle, the method comprising:

ascertaining, via an evaluation unit, a lateral deviation of the vehicle from the original lane and a steering angle course; and ascertaining, via the evaluation unit, at least one attention index as a measure of the attentional state, the attention index including at least one component of the lateral deviation of the vehicle from an original lane and one component of a steering angle correction;

wherein one of the following is satisfied: (i) the lateral deviation and the steering angle correction are multiplied with one another and each enters into the attention index; and (ii) components of the lateral deviation and the steering angle correction are added in the attention index.

2. The method of claim 1, wherein the lateral deviation and the steering angle correction are multiplied with one another and each enters into the attention index.

3. The method of claim 1, wherein the maximum lateral deviation and the maximum steering angle correction of a deviation and correction event are taken into account in ascertaining the attention index.

4. The method of claim 1, wherein the at least one attention index is assigned to each deviation and correction event.

5. The method of claim 4, wherein the correction indices of different successive deviation and correction events are added up to form a total index, which is the measure of the attentional state.

6. The method of claim 5, wherein the value of an attention index drops between successive deviation and correction events.

7. The method of claim 1, wherein the decline in a value of the attention index between successive deviation and correction events takes place exponentially.

8. The method of claim 1, wherein a warning signal which is displayed in the vehicle is generated in the event of a reduced attentional state.

9. The method of claim 1, wherein a signal for influencing the movement of the vehicle is generated in the event of a reduced attentional state.

10. The method of claim 1, wherein a driver assistance system is reparameterized in the event of a reduced attentional state, so that the reduced attentional state is taken into account by providing for an earlier onset of an intervention measure by the driver assistance system.

11. The method of claim 1, wherein the lateral deviation of the vehicle is determined by a lane departure assistant.

12. The method of claim 1, wherein the attention index is ascertained by multiplying two components from a maximum lateral deviation of the vehicle from the original lane and a maximum steering angle correction.

13. The method of claim 12, wherein a steering angle correction rate is also taken into account.

14. An attentional state detection system, comprising:
a lateral deviation detection unit to provide a lateral deviation of a vehicle from an original lane;
a steering angle sensor to provide a steering angle; and
an evaluation unit to ascertain the lateral deviation of the vehicle from the original lane and a steering angle course, and to ascertain at least one attention index as a measure of the attentional state, the attention index including at least one component of the lateral deviation of the vehicle from the original lane and one component of a steering angle correction;
wherein one of the following is satisfied: (i) the lateral deviation and the steering angle correction are multiplied with one another and each enters into the attention index; and (ii) components of the lateral deviation and the steering angle correction are added in the attention index.

15. The attentional state detection system of claim 14, wherein the lateral deviation detection unit includes a lane departure assistant for keeping the vehicle in the original lane.

16. The attentional state detection system of claim 14, wherein the attention index is ascertained by multiplying two components from a maximum lateral deviation of the vehicle from the original lane and a maximum steering angle correction.

17. The attentional state detection system of claim 16, wherein a steering angle correction rate is also taken into account.

18. The attentional state detection system of claim 14, wherein the at least one attention index is assigned to each deviation and correction event.

19. The attentional state detection system of claim 18, wherein the correction indices of different successive deviation and correction events are added up to form a total index, which is the measure of the attentional state.

20. The attentional state detection system of claim 19, wherein the value of an attention index drops between successive deviation and correction events.

* * * * *